United States Patent
Harendra et al.

(10) Patent No.: US 7,853,248 B2
(45) Date of Patent: Dec. 14, 2010

(54) SMS SPAM CONTROL

(75) Inventors: Rohini Harendra, Sunnyvale, CA (US); Olga Volodymyrivna Gavrylyako, Fremont, CA (US); Tong Zhu, Fremont, CA (US); Kenneth Tsz Ho, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 636 days.

(21) Appl. No.: 11/859,539

(22) Filed: Sep. 21, 2007

(65) Prior Publication Data

US 2009/0082042 A1 Mar. 26, 2009

(51) Int. Cl.
*H04M 3/00* (2006.01)

(52) U.S. Cl. .................. 455/418; 455/445; 455/466; 709/229

(58) Field of Classification Search ............ 455/418, 455/466, 455; 709/229
See application file for complete search history.

(56) References Cited

U.S. PATENT DOCUMENTS

| | | | |
|---|---|---|---|
| 6,986,049 B2 | 1/2006 | Delany | |
| 7,373,385 B2 | 5/2008 | Prakash | |
| 7,499,458 B2 * | 3/2009 | McDysan et al. | 370/396 |
| 7,738,436 B2 * | 6/2010 | Taniguchi | 370/340 |
| 7,768,917 B2 * | 8/2010 | Nakayama et al. | 370/230.1 |
| 2002/0068588 A1 * | 6/2002 | Yoshida et al. | 455/461 |
| 2002/0177456 A1 * | 11/2002 | Kimoto et al. | 455/466 |
| 2003/0088680 A1 * | 5/2003 | Nachenberg et al. | 709/229 |
| 2008/0207181 A1 * | 8/2008 | Jiang | 455/414.1 |

OTHER PUBLICATIONS

"Yahoo DomainKeys System Might Dent Spam," ITtoolbox Blogs: Viewpoint of a Linux Technologist, Dec. 2003, 4 pages, http://blogs.ittoolbox.com/linux/technologist/archives/yahoo-domainkeys-system-might-dent-spam-241 (accessed Jan. 4, 2008).

Burrell, Bruce, P., "The Plague of Viruses That Send Email with Forged "From:" Fields," U-M Virus Busters, Apr. 2004, 7 pages, http://virusbusters.itcs.umich.edu//forged_from.html (accessed Jan. 23, 2008).

Delany, M., "Domain-Based Email Authentication Using Public Keys Advertised in the DNS (DomainKeys)," Network Working Group: RFC 4871, May 2007, 39 pages, http://ietf.org/rfc/rfc4870.txt (accessed Jan. 4, 2008).

(Continued)

*Primary Examiner*—Danh C Le
(74) *Attorney, Agent, or Firm*—Frommer Lawerence & Haug LLP; Jamie L. Wiegand

(57) ABSTRACT

A system, apparatus, and method are directed towards managing abuse of text messages through controls on messages sent by an application to a mobile device (e.g., MT text messages). MT text messages sent from a defined application are intercepted by a Text Message SPAM Control Service (TMSCS). Various controls are determined for the sending application based on the application, level of user control on contents of the message, the user requesting the message to be sent (if any), and/or a destination address for the message. These controls may then be used in various combinations and/or various levels of constraint to determine whether to block transmission of the message to a destination mobile device. By monitoring messages from the application, abuse of the application may be minimized.

14 Claims, 3 Drawing Sheets

OTHER PUBLICATIONS

"Email—Why am I Getting Messages that Say I Tried to Send a Virus?," Forged Emails—Explained, Aperature.org: Technology, Computers, and Photography, 2 pages, http://www.aperature.org/forged_email.aspx (accessed Jan. 23, 2008).

Wong, M., "Send Policy Framework (SPF) for Authorizing Use of Domains in E-Mail, Version 1," Network Working Group: RFC 4408, Apr. 2006, 48 pages, http://tools.ietf.org/html/rfc4408 (accessed Feb. 7, 2008).

* cited by examiner

SMS SPAM CONTROL

TECHNICAL FIELD

The invention relates generally to mobile communications and more particularly, but not exclusively, to managing abuse by an end-user of an application service using text messaging to a client device.

BACKGROUND

The use of mobile technologies is steadily on the increase, for both business and personal uses. Mobile phones are a common site today and many people own personal information management (PIM) devices, palmtop computers, and so forth, to manage their schedules, contacts, and to stay connected with friends, family, and work. Employees on the move often appreciate the value of staying connected with their business through their mobile devices.

While a user of a mobile device may communicate with others using voice, email, or the like, communications with and/or through various application services on the internet may more commonly be performed using text messages, such as Short Message Service (SMS), Instant Messaging (IM), Multimedia Messaging Service (MMS), Enhanced Message Service (EMS), or the like. In some instances, a user may request that an application service send text messages to another user. For example, a user might find an interesting article on the internet, and request that it be sent to other users. In another example, a user might learn of a free service from an application service, and request text message be sent to other users through the free service.

Unfortunately, there are a few users that abuse or otherwise take advantage of the application services. For example, it is not uncommon, to discover a user that requests text messages be sent to themselves. This may be the case where a user is paid or otherwise receives a reward to receive text messages. In another instance of abuse, a user might initiate text messages be sent to a plurality of users, where each recipient user is obligated to pay for the receipt of the text message. This type of abuse may not only result in abuse to the recipient user, but may actually damage a reputation of the sending application service that has been 'tricked' into sending the messages. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
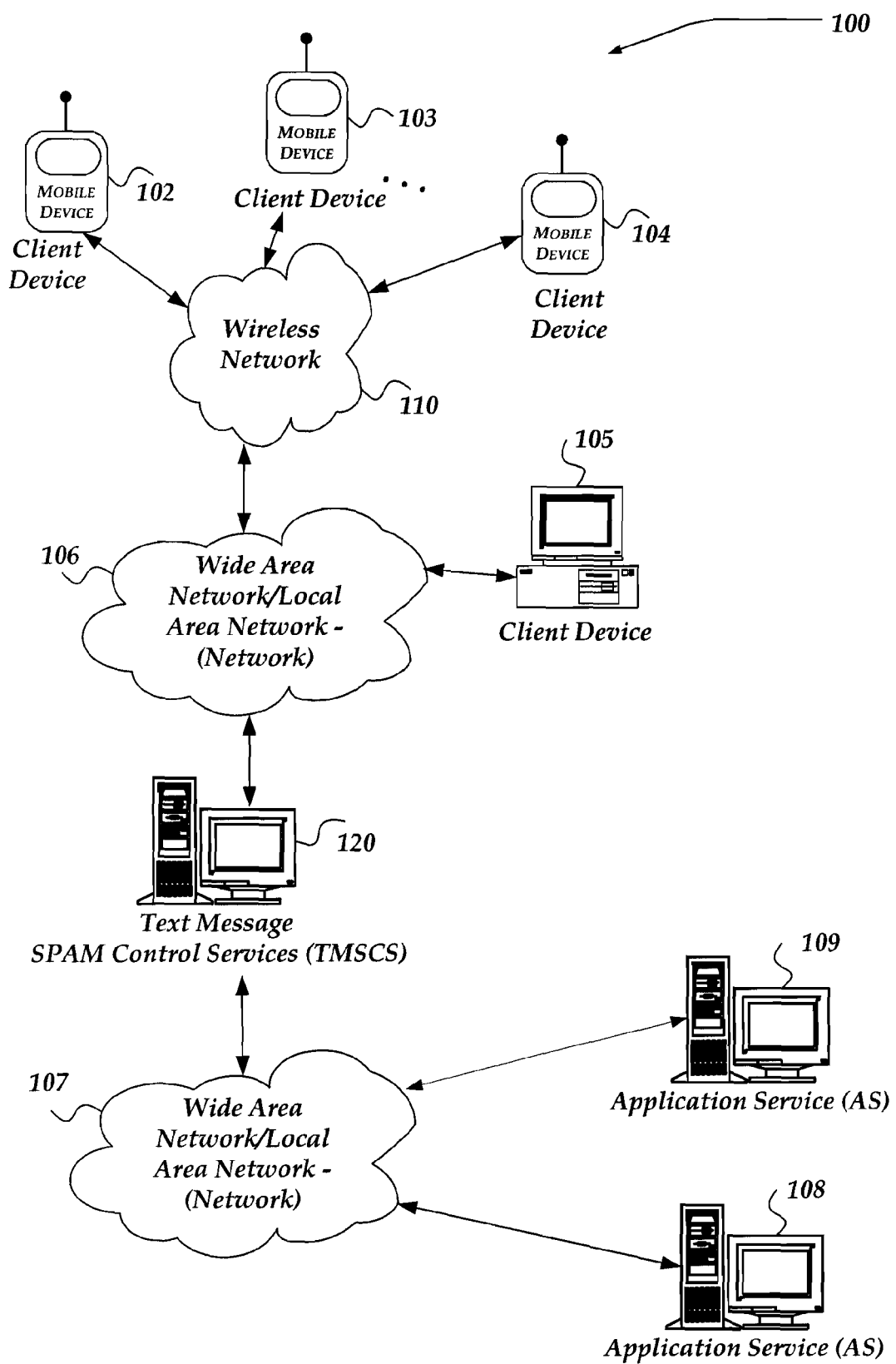
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term Short Message Service (SMS) refers to a communication mechanism for providing connectionless transfers of limited size messages between networked devices. SMS messages may be cell broadcast services which are periodically delivered short message to a pre-defined set of computing devices in a given area, or point-to-point services which include short messages sent to a specific user. The SMS protocol is described in more detail in International Standard ISO/IEC 21989, which is available at through the International Standards Organization (ISO). As used herein, SMS refers to all such Short Message communications, and those derived therefrom.

As used herein, the terms "text messaging," and "text message" refer to SMS messaging, as well as a variety of other limited size message protocols, including, but not limited to Instant Messaging (IM), Multimedia Messaging Service (MMS) message, or an Enhanced Message Service (EMS) messaging protocols.

Moreover, the terms "mobile originated," and "MO" refer to any communications that originates or is initiated from a mobile device, while the terms "mobile terminated," and "MT" refer to any communications that terminates at the mobile device. Thus, if an application, such as an email application, web service application, or the like, sends a message to a mobile device, such message is known as a MT type message. Similarly, a message sent by a mobile device to the application is known as a MO type message. Messages that are sent between two mobile devices are known as "mobile to mobile," or "MTM" communications.

Briefly stated, the present invention is directed towards a system, apparatus, and method for managing abuse of text messages through controls on messages sent by an application service to a mobile device (e.g., MT text messages), or other end-user client device. MT text messages sent from a defined application are intercepted by a Text Message SPAM Control Service (TMSCS). As noted above, one embodiment of an intercepted text message may be an SMS message.

Various controls are determined for the sending application based on the application, level of user control on contents of the message, the user requesting the message to be sent (if any), and/or a destination address for the message. These controls may then be used in various combinations and/or various levels of constraint to determine whether to block transmission of the message to a destination mobile device or other client device. By monitoring messages from an application service, abuse of the application service may be minimized. Such abuse monitoring is directed towards minimizing costs of sending messages to destination devices, where the application service or application owner might be paying for the messages, as well as minimizing dissatisfaction with the application service by recipients of unwanted text messages that might be obligated to pay for the SPAM message, or otherwise fail to appreciate the message's content.

Illustrative Operating Environment

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(networks) 106-107, wireless network 110, mobile devices 102-104, client device 105, application services (AS) 108-109, and Text Message SPAM Control Services (TMSCS) 120.

Generally, mobile devices 102-104 may include virtually any portable computing device capable of receiving and sending a message over a network, such as networks 106-107, wireless network 110, and the like, to and from another computing device, another mobile device, and the like. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), Mobile Subscriber ISDN (MSISDN), network address, or other device identifier. The information may also indicate a content format that the mobile device is enabled to employ. Such information may be provided in a message, or the like, to other computing devices.

Mobile devices 102-104 may be configured to communicate a message, such as a text message, using Short Message Service (SMS), Multimedia Message Service (MMS), instant messaging (IM), internet relay chat (IRC), Mardam-Bey's IRC (mIRC), Jabber, and the like, between another computing device. However, the present invention is not limited to these message protocols, and virtually any other message protocol may be employed.

Mobile devices 102-104 may be further configured to enable a user to participate in communications sessions, such as text messaging sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, and the like. Moreover, the end-user account may be further configured to enable the end-user authorization to start an IM session, or other communications session, on a mobile device.

Mobile devices 102-104 may each receive messages sent from AS 108-109, from one of the other mobile devices 102-104, or even from another computing device. Mobile devices 102-104 may also send messages to one of AS 108-109, other mobile devices, or client device 105, or the like. In one embodiment, mobile devices 102-104 may request information to be sent to itself, using, for example, text messaging. In another embodiment, mobile devices 102-104 may also request that one of AS 108-109 send information using, for example, text messaging, to another mobile device 102-104 (or to client device 105). In one embodiment, the requesting mobile device may be charged a fee to receive the text message. In another embodiment, the requesting mobile device may instead receive payment for receipt of the text message, such as might arise based on a promotion, advertisement, or the like. In still another embodiment, where the text message is sent to a destination client device, such as one of mobile devices 102-104, or client device 105, the destination client device might be charged a fee for receiving and/or reading of the text message.

In one embodiment, the requesting mobile device (or client device 105), may be enabled to modify at least a portion of the text message to be sent by AS 108-109. For example, a user of the requesting device might be able to select, edit, or otherwise, provide at least a portion of the text message. In one embodiment, however, the user may have no control on the text message that is to be delivered to a destination client device.

Mobile devices 102-104 may also communicate with non-mobile client devices, such as client device 105, or the like. In one embodiment, such communications may include participation in social networking activities, receiving and/or sending text messages, or the like. The set of such devices may include devices that typically connect using a wired communications medium such as personal computers, multiprocessor systems, microprocessor-based or programmable consumer electronics, network PCs, or the like. Similarly, client device 105 may include one or more applications as described above in conjunction with mobile devices 102-104. For example, in one embodiment, client device 105 may be configured to request text messages from AS 108-109, and/or request text messages be sent by AS 108-109 to any of mobile devices 102-104, or even to itself.

Wireless network 110 is configured to couple mobile devices 102-104 and its components with network 106. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including, but not limited to 2nd (2G), 3rd (3G), $4^{th}$ (4G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 106 is configured to enable communications between client device 105, and TMSCS 120 through wireless network 110 to mobile devices 102-104. Similarly, network 107 is configured to enable communications between AS 108-109 and TMSCS 120 and network 106 and wireless network 110 with client devices 102-105.

Networks 106-107 are enabled to employ any form of computer readable media for communicating information from one electronic device to another. Also, network 106 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, networks 106-107 include any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

AS 108-109 includes virtually any device that may be configured to provide an application service. Such application services or simply applications include, but are not limited to, email applications, search applications, video applications, audio applications, graphic applications, social networking applications, text message applications, or the like. In one embodiment, AS 108-109 may operate as a web server. However, AS 108-109 are not limited to web servers, and may also operate as a messaging server, a File Transfer Protocol (FTP) server, a database server, a content server, or the like, in which to provide an application. Additionally, each of AS 108-109 may be configured to perform a different operation. Thus, for example, AS108 may be configured as a messaging server, while AS 109 is configured as a database server, social networking server, or the like. However, AS 108-109 may each be configured to communicate using text messages. Devices that may operate as AS 108-109 include personal computers desktop computers, multiprocessor systems, microprocessor-based or programmable consumer electronics, network PCs, servers, and the like.

AS 108-109 may be configured to initiate a message to be sent to one of client devices 102-105. Such messages may include, for example, an alert, an advertisement, a relayed message, a news message, or the like. In one embodiment, AS 108-109 may also respond to a request to perform some action, from one of client devices 102-105, or even another computing device. For example, in one embodiment, AS 108-109 may receive a request to send a message, an alert, an advertisement, or the like, to one or more of client devices 102-105. However, AS 108-109 are not limited to sending a message based on a request from another device. Thus, for example, AS 108-109 may also initiate sending of a text message to a computing device, based on an internal action, condition, or the like, including for example, promoting a new product, a new service, sending of an advertisement, or the like.

AS 108-109 may receive from a computing device requesting that a message be sent, the requesting device's device identifier. AS 108-109, may also receive or otherwise determine, a user identifier, user account, or the like, associated with the requesting device. In one embodiment, AS 108-109 may also receive a destination device's device identifier. In one embodiment, AS 108-109 may be configured to charge a fee for sending the text message. In one embodiment, the fee might be charged to the requesting device, requesting user, or the like. In another embodiment, the fee might be charged to the destination device. However, a fee might also be charged to both the requesting device and to the destination device. In still another embodiment, the requesting and/or destination device may also receive a reward, such as payment, a discount, or the like, for messages received. In any event, messages that are to be sent by AS 108-109 to one or more of client devices 102-105 may be intercepted by TMSCS 120.

TMSCS 120 is configured and arranged to intercept messages, such as text messages, being sent from AS 108-109 and to determine whether to block the message from being forwarded to a destination device, or to allow the message to be sent to the destination device. TMSCS 120 may receive messages, such as MT messages, and perform an analysis on the message. In one embodiment, TMSCS 120 determines various message controls to apply during the analysis. For example, TMSCS 120 may determine application controls, message delivery controls, requester controls, and/or destination controls. In one embodiment, such message controls may place limits on a number of messages that might be sent. For example, in one embodiment, an application control might determine for different applications managed by AS 108-109, that different numbers of text messages might be allowed to be sent to a destination device during a defined time period. Thus, for example, TMSCS 120 might collect historical metrics on message traffic from a particular application. Then, in part, based on the historical metrics, TMSCS 120 might establish a limit on a number of messages that the particular application might be expected to send during the defined time period. For example, based on the historical message traffic pattern, TMSCS 120 might determine that during a typical day, about 5000 messages might be sent by the particular application. TMSCS 120 might then set the limit based on the typical number of messages (e.g., 5000/day). For example, in one embodiment, TMSCS 120 might set the maximum allowed messages from the particular application to be 10000 messages, or the like. However, it should be noted that other values of messages might be observed for a typical time period, and moreover, the maximum allowed messages may also be set to some other value. Thus, the values provided herein, are intended merely as examples, and not to limit or otherwise constrain the invention.

Similarly, TMSCS 120 might determine, based on historical message metrics, and the like, other limits on messages that might be allowed. Thus, TMSCS 120 might set a limit on a number of messages based on whether a requesting user has full control of contents of the message, partial control of the contents of the message, or no control on the contents of the message sent to the destination device(s). For example, an application might provide a user with an ability to allow a user to enter virtually any message content the user might want. In another example, another application might enable the user to select from a defined list of message content to send, while in yet another application, the user might be restricted from entering and/or selecting content of the message. Thus, based on a message delivery control, various limits for a number of messages to be sent may be determined.

TMSCS 120 may further determine limits for messages based on a requesting device's device identifier, a requesting user's account identifier, or the like, as well as, or instead of, based on a destination device's device identifier. However, TMSCS 120 is not so limited, and virtually any message controls may be determined based on virtually any criteria, condition, or the like. Moreover, TMSCS 120 may combine the message controls using some or all of the message control limits to determine whether to send the message to the destination device. Thus, for example, TMSCS 120 might determine whether to allow a message to be sent based on whether none of the application control, the destination device control, and/or the requesting device controls are exceeded. However, as stated, other combinations may also be used.

TMSCS 120 may maintain historical metrics of messages sent and/or blocked for a given application, requesting device, message delivery control, and/or destination device. TMSCS 120 may then employ the historical metrics to determine whether to modify one or more of the message controls. In one embodiment, TMSCS 120 may provide information about some of the metrics to one of the application, the requesting device, and/or destination device. Based on the provided information, TMSCS 120 may receive feedback indicating that at least one of the message controls might be modified. In one embodiment, TMSCS 120 might select to modify the message control, or maintain the current level. For example, where the requesting device continues to exceed the maximum message control assigned to it, for some time period, TMSCS 120 might select to send a warning to the requesting device, rather than adjusting upwards the message control. This may be based, for example, on an indication that the requesting device is sending SPAM, improperly obtaining enrichment from the sending of the messages, or otherwise harassing other users. In any event, in one embodiment, TMSCS 120 might employ a process such as described below in conjunction with FIG. 3 to perform at least some of its actions.

Illustrative Server Environment

Figure 2:
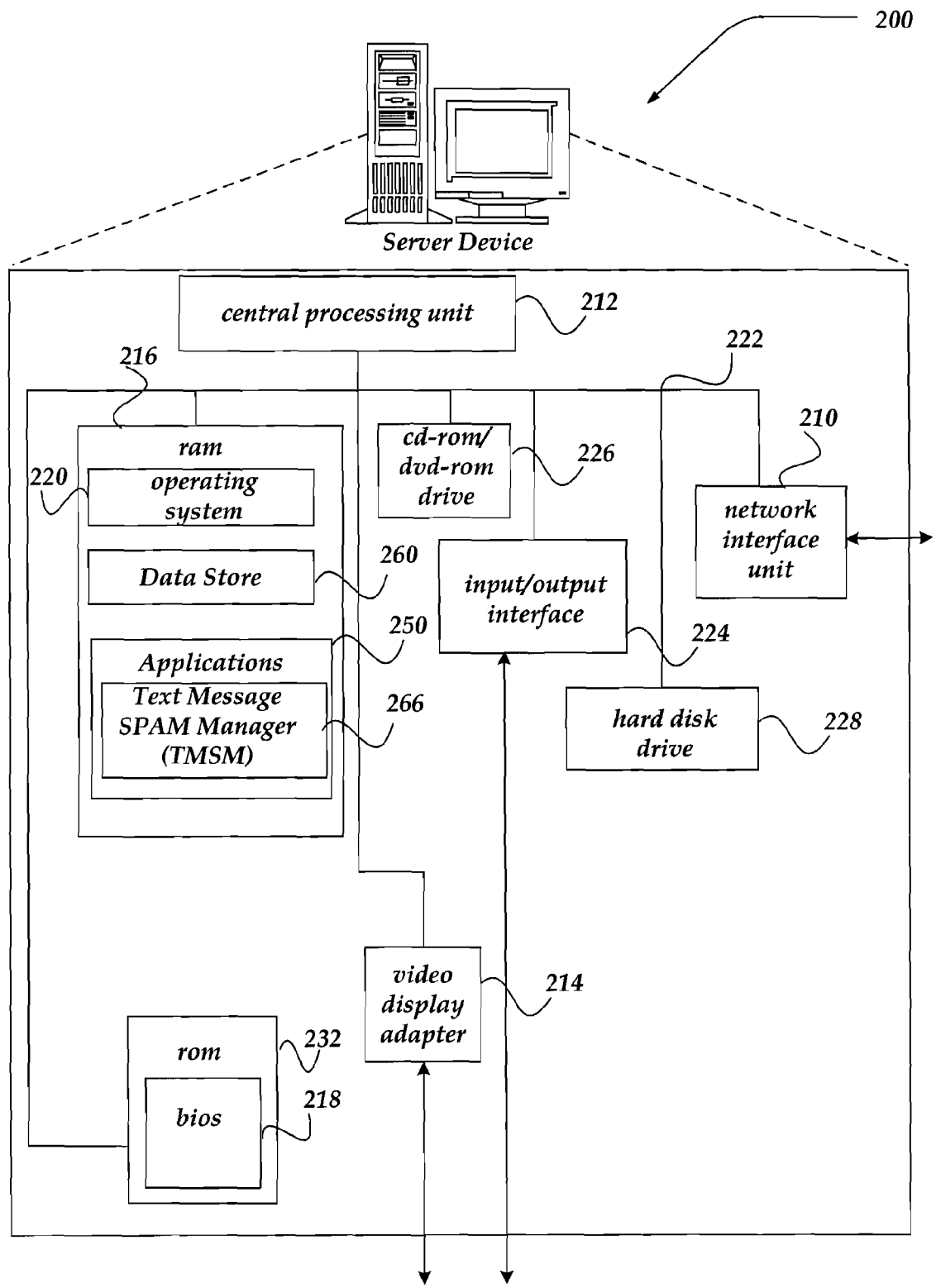
FIG. 2 shows one embodiment of a server device that may be included in a system implementing the invention.

FIG. 2 shows one embodiment of a server device, according to one embodiment of the invention. Server device 200 may include many more components than those shown. The components shown, however, are sufficient to disclose an illustrative embodiment for practicing the invention. Server device 200 may, for example, TMSCS 120 of FIG. 1.

Server device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server device 200. Any general-purpose operating system may be employed. Basic input/output system ("BIOS") 218 is also provided for controlling the low-level operation of server device 200. As illustrated in FIG. 2, server device 200 also can communicate with the Internet, or some other communications network, such as networks 106-107 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 also includes input/output interface 224 for communicating with external devices, such as a mouse, keyboard, scanner, or other input devices not shown in FIG. 2. Likewise, server device 200 may further include additional mass storage facilities such as CD-ROM/DVD-ROM drive 226 and hard disk drive 228. Hard disk drive 228 is utilized by server device 200 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, messaging services, database programs, word processing programs, spreadsheet programs, security programs, and so forth. Mass storage may further include applications such as data store 260 and Text Message SPAM Manager (TMSM) 266.

Data store 260 may include virtually any mechanism configured and arranged to store and otherwise manage message controls, historical data of messages sent and/or messages blocked. Data store 260 may be implemented using, for example, a database, a script, a spreadsheet, a file structure, folders, a program, or the like.

TMSM 266 may include virtually any mechanism configured to intercept messages, such as text messages, being sent from an application and to determine whether to block the message from being forwarded to a destination device, or to allow the message to be sent to the destination device. As such, TMSM 266 is configured to perform the actions described above for TMSCS 120 of FIG. 1, and described below in conjunction with FIG. 3.

Generalized Operation

Figure 3:
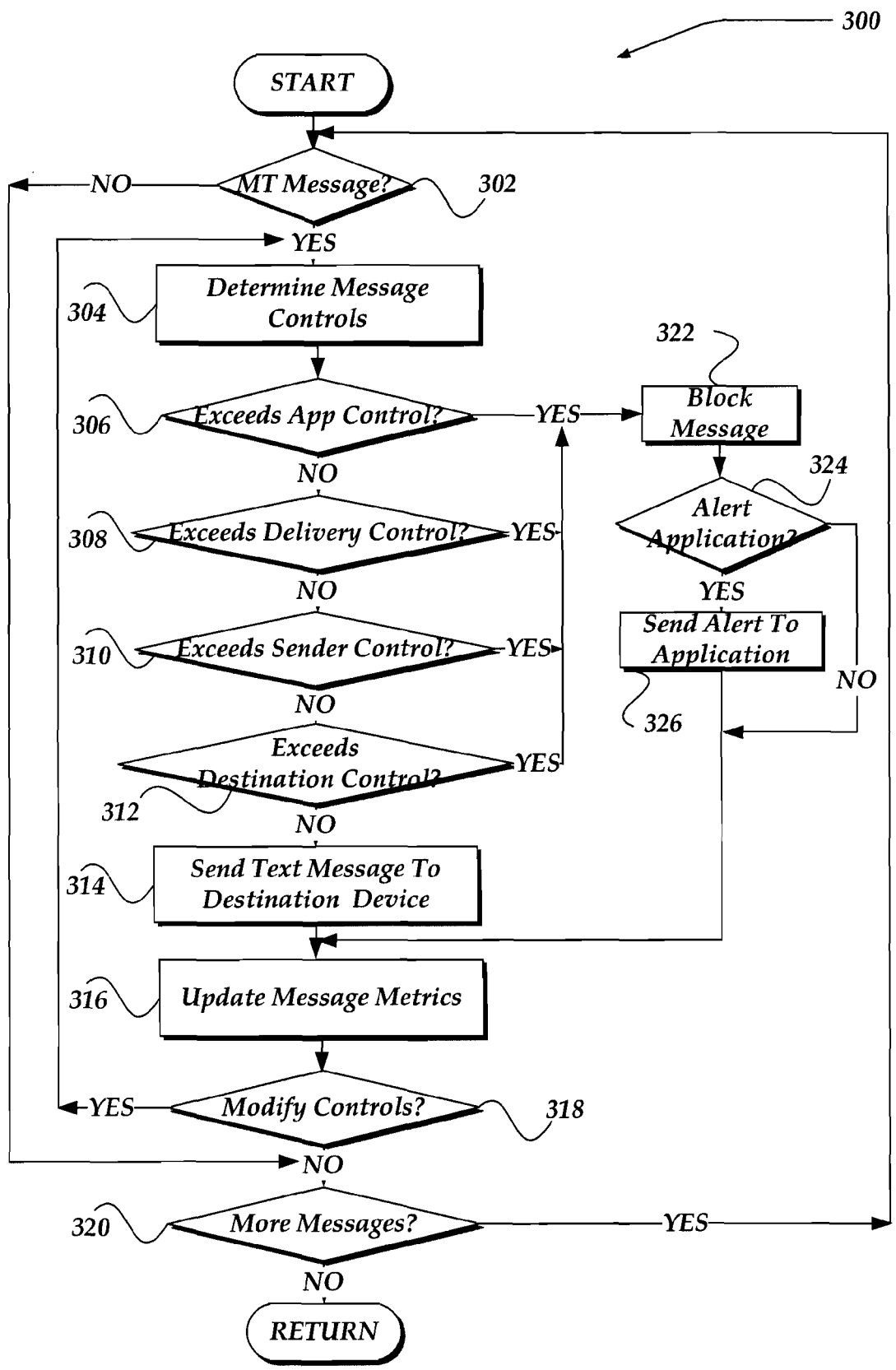
FIG. 3 illustrates a logical flow diagram generally showing one embodiment of an overview process for managing potential SPAM messages sent by an application towards a destination computing device.

The operation of certain aspects of the invention will now be described with respect to FIG. 3. FIG. 3 illustrates a logical flow diagram generally showing one embodiment of an overview process for managing potential SPAM messages sent by an application towards a destination computing device. In one embodiment, the messages are sent using SMS. However, the message may also be sent using virtually any text messaging protocol, including those mentioned above.

As such, process 300 of FIG. 3 begins, after a start block, at decision block 302, where a determination is made whether an intercepted message is an MT type message. That is, a determination is made whether the message is being sent to as a mobile terminated message. It should be noted, however, that other types of messages sent by an application to a computing device may also be monitored through process 300. Thus, for example, in one embodiment, the determination might filter messages sent by a defined application towards a destination client device, from for example, messages being sent to the application. Thus, if the message is an MT type message (or another type of message sent by the application to a destination client device), processing flows to block 304; otherwise, processing may branch to decision block 320.

At block 304, message controls are determined for based on a combination of at least one of an application control, a message delivery control, a requester control, or a destination control, wherein the message controls limit a number of messages to be sent, as described above.

Processing continues next to decision block 306, where a determination is made whether for the application sending the message, whether the determined message control is exceeded. It should be noted, that as described above, not all of the message controls evaluated in decision blocks 306, e08, 310, and 312 need be employed, and any combination of one or more of the message controls may be used for the intercepted message. Thus, while each of the message controls are illustrated, and described, it should be clear that one or more of the message controls may be ignored for a particular message. In any event, given this condition, if application message controls are employed, and if it is determined that the application message controls are exceeded, processing branches to block 322; otherwise, processing flows to the next message control evaluation, which as illustrated is decision block 308.

At decision block 308, and assuming that this message control is employed, a determination is made whether the number of messages based on the message delivery controls is exceeded. Such message delivery controls, as noted above may be based on an amount of control of the content a requesting user might have. For example, if the requesting user has no control on the contents of the message a higher limit might be employed, than where the user has full control on the contents. However, the message delivery control limits need not be configured as such, and other configurations may also be used, without limiting the scope of the process. Moreover, such information about the amount of control a requesting user might have may be provided by the sending message. For example, in one embodiment, such delivery control information might be appended to the message, sent separately by the application, or included with the message as part of a header, a portion of the content, or the like. In any event, if this message control is employed and if it is exceeded, processing branches to block 322; otherwise, processing continues to decision block 310.

At decision block 310, and assuming that this message control is employed, a determination is made whether the number of message based on a requesting sender (requesting user, requesting device identifier, or the like) is exceeded. In one embodiment, the application sending the message may include such information appended to the message, sent separately by the application, or even included with a message header, body, or the like. In any event, if the message control for the requesting sender is exceeded, processing branches to block 322; otherwise, processing continues to decision block 312.

At decision block 312, and assuming that this message control is employed, a determination is made whether the number of message based on the destination device's identifier is exceeded. In one embodiment, the destination device's identifier might be included within a message header. In any event, if the message control for the destination device's device identifier is exceeded, processing branches to block 322; otherwise, processing continues to block 314.

At decision block 314, none of the combination of one or more message controls was exceeded. Thus, the text message is sent to the destination device. Processing then continues to block 316, where message metrics are obtained. Such metrics may include information about the message as to whether it was sent or blocked, the sending application, the level of control on the content by the requesting sender (delivery control), the requesting device's identifier, and the destination device's device identifier.

Processing flows next to decision block 318, where, based on either feedback from the application, destination device user, or perhaps the requesting device, and/or the collected historical metrics, a determination is made whether to modify one or more of the limits for the message controls. If so, processing loops back to block 304; otherwise, processing flows to decision block 320, where a determination is made whether another message is intercepted. If so, processing loops back to decision block 302; otherwise, processing may return to a calling process to perform other actions.

Back at block 322, however, it was determined that at least one message control limit was exceeded. As such, the message may be blocked from being sent to the destination device. In one embodiment, the message may be permanently blocked. Processing then flows to decision block 324, where a determination is made whether to alert the sending application that messages have been blocked. In one embodiment, the alert might be based on a particular time period. In another embodiment, the alert might not be sent until the message controls have been exceeded for a defined number of time periods, thus minimizing the number of alert messages received by the application. Moreover, in one embodiment, based on similar criteria, the destination device, and/or the requesting device, might also receive an alert indicating that messages have been blocked. In one embodiment, if it is determined that the requesting device might be abusing the application, then no alert might be sent to the requesting device. Instead, an alert might be sent to the application, to an administrator, or the like, such that a privilege, or the like, might be withdrawn for the requesting device. In any event, if an alert is sent, processing flows to block 326, where the alert is sent; otherwise, processing branches around block 326 to block 316. After block 326, processing also flows to block 316.

It should be noted that various embodiments of the flows of process 300 may also be implemented, without departing from the intended scope of the process. Thus, for example, one or more message controls might be selected for the intercepted message. Then each of the message controls might be tested to determine which ones, if any, are exceeded. In this manner, if several message controls are exceeded, additional metrics may be obtained. However, other flows may also be implemented, without narrowing the scope, and are envisaged by the invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for use in managing a communication to a computing device over a network, comprising:
   a plurality of applications, each application within the plurality being configured to send and to receive text messages with the computing device; and
   a server device that is coupled to the plurality of applications and is configured to perform actions, including:
      intercepting a text message from one of the applications destined to the computing device;
      determining message controls based on a combination of at least one of an application control, a message delivery control, a requester control, or a destination control, wherein the message controls limit a number of messages to be sent;
      if the number of messages exceed at least one of the determined message controls for a defined time period, blocking the message from being sent; and
      if the number of messages is less than or equal to each of the determined message controls for the defined time period, enabling the intercepted message to be sent to the mobile device.

2. The system of claim 1, wherein the application control defines a maximum number of text messages that can be sent for the application within the defined time period.

3. The system of claim 1, wherein the message delivery control defines a maximum number of text messages that can be sent within the defined time period based on a level of control of a user requesting that the text message be sent has on content of the message.

4. The system of claim 1, wherein the requester control defines a maximum number of text messages that can be sent based on a request from a requesting device identifier within the defined time period, and wherein the destination control defines a maximum number of messages that can be sent to the destination computing device within the defined time period.

5. The system of claim 1, wherein the server device is configured to perform actions, further comprising:
   updating metrics associated with a number of allowed messages to be sent based on the message controls;
   updating metrics associated with a number of blocked messages based on the message controls; and
   modifying the message controls based, in part, on the metrics of blocked and allowed text messages.

6. The method of claim 5, further comprising:
   if the requester of the message to be sent is charged for the sending of the text message, allowing the text message to be sent and the requester to be charged.

7. A method for use in managing a communication to a destination client device over a network, comprising:
   intercepting a text message from one of the applications destined to the destination client device;
   determining message controls based on at least one of an application control, a message delivery control, a requester control, or a destination control, wherein the message controls provide limits a number of messages to be sent;
   if the number of messages exceed the one of the determined message controls for a defined time period, blocking the message from being sent; and if the number of messages is less than or equal to each of the determined message controls for the defined time period, enabling the intercepted message to be sent to the destination client device.

8. The method of claim 7, wherein the application control defines a maximum number of text messages that can be sent for the application within the defined time period.

9. The method of claim 7, wherein the message delivery control defines a maximum number of text messages that can be sent within the defined time period based on a level of control of a user requesting that the text message be sent has on content of the message.

10. The method of claim 7, further comprising:
modifying at least one message control based on feedback from at least one of the application, the destination client device, or a requester that requested that the application send the text message.

11. A server comprising:
a memory for storing logical instructions;
a processor for executing the logical instructions stored in the memory, the execution of the logical instructions causing actions to be performed, including:
performing at least a portion of the method of claim 7;
collecting metrics indicating a number of messages blocked for the application and a number of messages sent for the application; and
modifying at least one of the message controls based on the collected metrics, wherein the modified message controls are employed for another intercepted message.

12. An application service server device for use in managing a communication to a destination device over a network, comprising:
a transceiver that is configured to send and to receive messages over a network; and
a processor, coupled to the transceiver, that is arranged to perform actions, including:
receiving a request for a text message to be sent to the device, wherein the request is received from a requesting device;
sending the text message to towards the destination device, wherein the text message is intercepted by another server device that is configured to perform actions, including:
determining message controls based on at least one of an application control, a message delivery control, a requester control, or a destination control, wherein the message controls limit a number of messages to be sent;
if the number of messages exceed at least one of the determined message controls for a defined time period, blocking the text message from being sent to the destination device; and
if the number of messages is less than or equal to each of the determined message controls for the defined time period, enabling the intercepted text message to be sent to the destination device; and
receiving information indicating whether the message is blocked or sent; and
based on the received information, determining whether to request that the message controls be modified for the application service.

13. The apparatus of claim 12, wherein the application control defines a maximum number of text messages that can be sent for an application managed by the application service within the defined time period.

14. The apparatus of claim 12, wherein the message controls limit is determined for each of at least one of an application control, a message delivery control, a requester control, or a destination control.

* * * * *

UNITED STATES PATENT AND TRADEMARK OFFICE
CERTIFICATE OF CORRECTION

PATENT NO.        : 7,853,248 B2
APPLICATION NO.   : 11/859539
DATED             : December 14, 2010
INVENTOR(S)       : Rohini Harendra et al.

Page 1 of 1

It is certified that error appears in the above-identified patent and that said Letters Patent is hereby corrected as shown below:

On the Title page, in field (74), in column 1, in "Attorney, Agent or Firm", line 1, delete "Lawerence" and insert -- Lawrence --, therefor.

In column 6, line 32, delete "AS108" and insert -- AS 108 --, therefor.

Signed and Sealed this
Twenty-sixth Day of April, 2011

David J. Kappos
*Director of the United States Patent and Trademark Office*